No. 879,307. PATENTED FEB. 18, 1908.
R. M. PALMER.
SYSTEM OF ELECTRICAL DISTRIBUTION.
APPLICATION FILED MAR. 17, 1906.
2 SHEETS—SHEET 1.
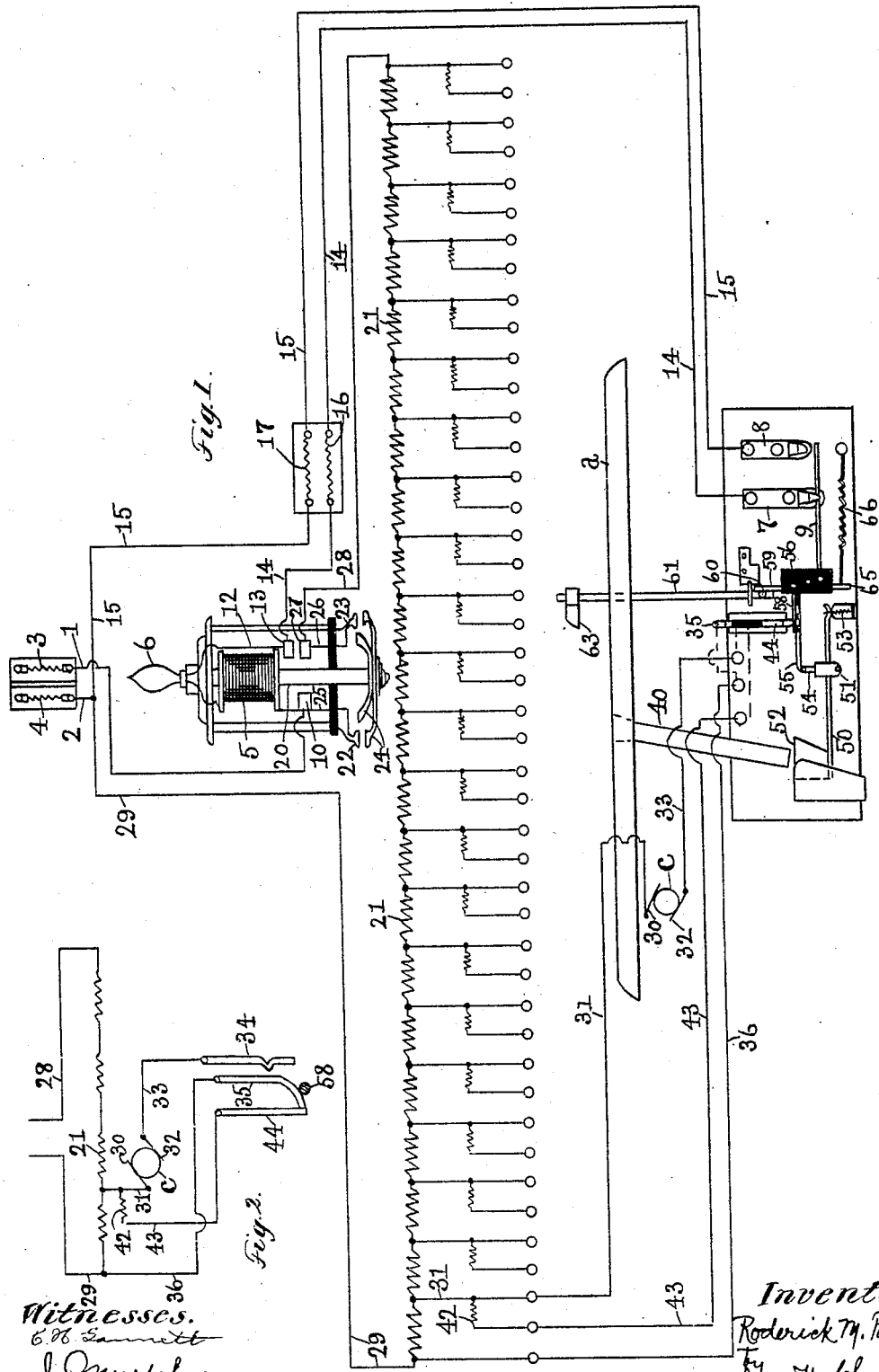
Witnesses.
Inventor.
Roderick M. Palmer No. 879,307. PATENTED FEB. 18, 1908.
R. M. PALMER.
SYSTEM OF ELECTRICAL DISTRIBUTION.
APPLICATION FILED MAR. 17, 1906.
2 SHEETS—SHEET 2.
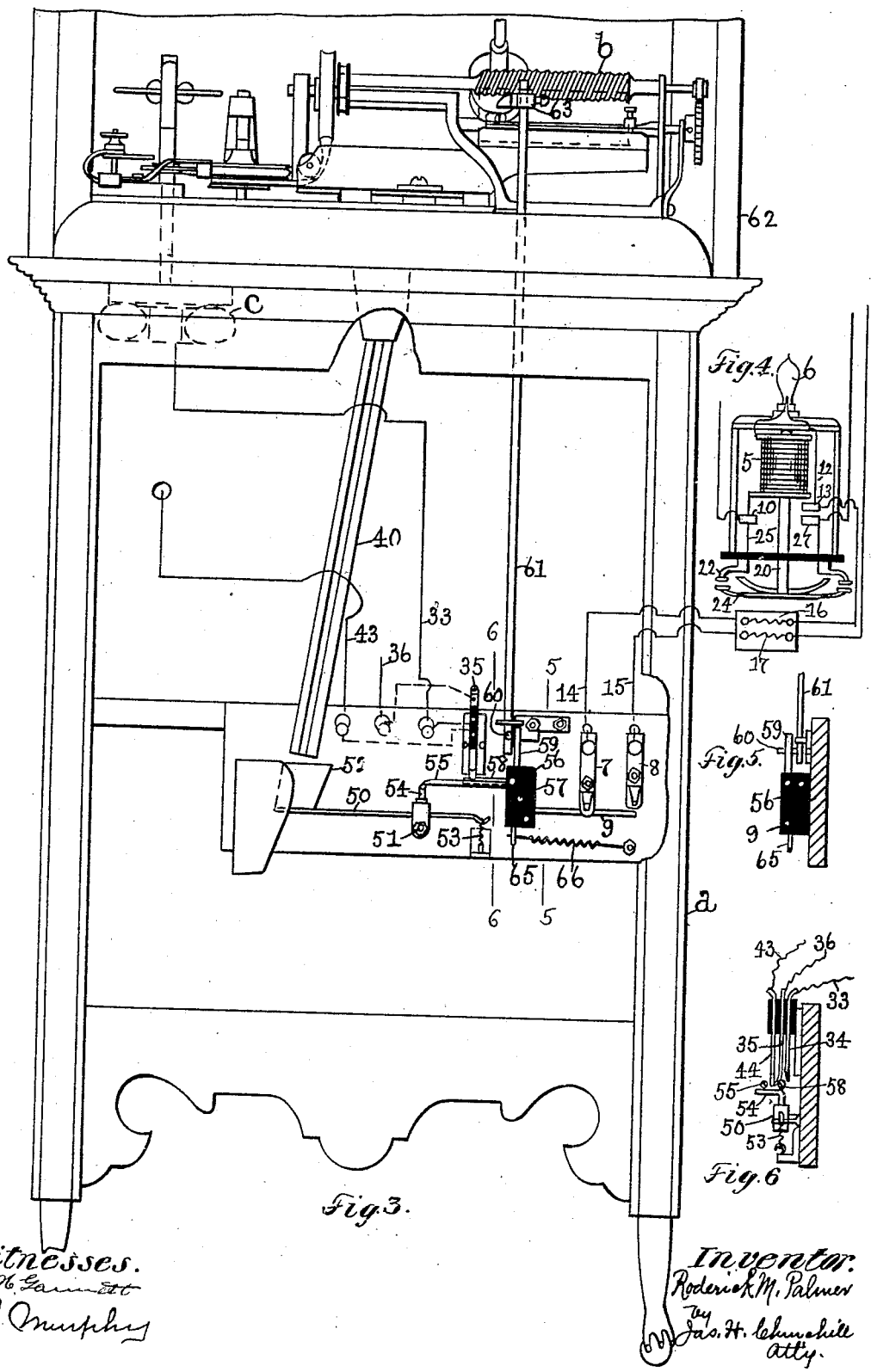

UNITED STATES PATENT OFFICE.

RODERICK M. PALMER, OF CAMBRIDGE, MASSACHUSETTS, ASSIGNOR TO PALMER ELECTRICAL COMPANY, OF BANGOR, MAINE.

SYSTEM OF ELECTRICAL DISTRIBUTION.

No. 879,307.     Specification of Letters Patent.     Patented Feb. 18, 1908.

Application filed March 17, 1906. Serial No. 306,518.

*To all whom it may concern:*

Be it known that I, RODERICK M. PALMER, a citizen of the United States, residing in Cambridge, in the county of Middlesex and State of Massachusetts, have invented an Improvement in Systems of Electrical Distribution, of which the following description, in connection with the accompanying drawings, is a specification, like letters on the drawings representing like parts.

This invention relates to a system of electrical distribution of that class in which a translating device responsive to a current of relatively low voltage may be safely operated from a circuit of relatively high voltage, such, for instance, as shown in U. S. Patent No. 807,960 granted to me December 19, 1905.

The present invention has for its object to provide a system of the class described, in which a plurality of translating devices may be individually or conjointly operated by the current of relatively high voltage, and the circuit of the said devices individually controlled, so that one of the translating devices may be operated or a plurality may be simultaneously operated as will be described.

The invention is especially adapted among other uses to be employed for supplying current from a circuit of relatively high voltage, such as an incandescent lamp circuit to a plurality of electric motors employed to operate a plurality of graphophones or other instruments, there being an electric motor for each graphophone.

As now commonly constructed the graphophone is operated by an electric motor which is supplied with current from a battery contained in the cabinet supporting the graphophone, each individual motor being connected in circuit with its own battery located in the cabinet and governed by a circuit controller which is adapted to be closed to start the motor, by a penny dropped into a chute carried by the cabinet.

The present invention has for its object to provide a system wherein a plurality of such instruments may be supplied with current from an incandescent lamp circuit or other circuit of relatively high voltage, without danger of burning out or otherwise injuring the motors, and so that any of the instruments may be operated or a plurality or all of the instruments may be simultaneously operated.

These and other features of this invention will be pointed out in the claims at the end of this specification.

Figure 1 is a diagrammatic view of a system embodying this invention. Fig. 2, a detail to be referred to. Fig. 3, is a front elevation with parts broken away of one of the motor-operated graphophone instruments included in the system shown in Fig. 1, Fig. 4, a detail to be referred to, Fig. 5, a section on the line 5—5, Fig. 3, and Fig. 6, a section on the line 6—6, Fig. 3.

Referring to the drawings, $a$ represents a cabinet which supports a graphophonic instrument of any suitable or usual construction and the cylinder $b$ of which is rotated by an electric motor $c$, in a manner well understood. The cabinet $a$, graphophonic instrument and electric motor $c$ for operating the same may be such as now commonly employed in amusement parlors, and need not be described in detail.

As now commonly practiced, an amusement parlor, such as now found in large cities contains a substantially large number of these instruments, each self-contained and each provided with its own battery, usually a storage battery, for operating the motor $c$. The storage batteries referred to are expensive to install and to maintain and require frequent care. The present invention has for its object to dispense with the individual batteries and provide a system in which the motors $c$ of a substantially large number of instruments may be supplied with current from the incandescent lamp system employed to light the parlor. For this purpose, the system shown in Fig. 1 is employed in which 1, 2 represent the line wires of an incandescent lamp circuit provided with the usual line fuses 3, 4. The line wires 1, 2 have connected with them a circuit containing an electromagnet 5, a lamp 6, and the terminals 7, 8, of a normally open circuit controller, the coöperating member 9 of which is shown as a rod or bar and which circuit controller may be designated the starting switch or circuit controller.

In the diagram shown in Fig. 1, the electromagnet 5 has one end of its coil connected to a terminal 10 to which the main line wire 1 is connected, the other end of the magnet coil being joined to one terminal of the lamp 6, the other terminal of which is joined by wire 12 with a terminal 13, which is connected by wire 14 with the switch terminal 7. The switch terminal 8 is connected by wire 15 to the line wire 2. The wires 14, 15 may include the fuses 16, 17. It will thus be seen that the electromagnet 5 is located in a circuit supplied with current from the main line 1, 2, and that said magnet is energized when the switch member 9 engages the terminals 7, 8. This circuit may be traced as follows:—by the wire 1 to terminal 10, thence through the magnet 5, lamp 6, and wire 12 to terminal 13, thence by wire 14 to switch terminal 7, thence by member 9, terminal 8, and wire 15 to the line wire 2.

The electromagnet 5 is represented as a solenoid, and when energized attracts its core 20 and thereby closes a circuit containing a series of resistances 21, one for each motor c. This circuit for sake of distinction may be termed the shunt circuit for the magnet 5, and is provided with a circuit controller comprising fixed terminals 22, 23, with which coöperate a movable member, consisting as shown of two springs 24 attached to the armature or core 20 of the magnet 5. The terminal 10 is connected by wire 25 to the terminal 22, and the terminal 23 is connected by wire 26 to a terminal 27 to which is connected a wire 28 joined to one end of the resistances 21 which are arranged in series, and are connected at the other end by a wire 29, to the line wire 2. It will thus be seen that when the electromagnet 5 is energized, the circuit containing the resistances 21 is closed by the switch member 24. This circuit may be traced as follows—by line wire 1 to terminal 10, thence by wire 25 to terminal 22, thence by switch member 24, terminal 23 and wire 26 to terminal 27, thence by wire 28 through the resistances 21 and wire 29 to the line wire 2. It will be observed that the main line current divides at the terminal 10, a portion flowing through the circuit containing the magnet 5, and the other portion passing through the shunt circuit just described. The shunt circuit containing the resistances 21 has connected to it branch circuits containing the motors c. In the present instance, the shunt circuit is represented as containing twenty-two resistances, and the system is designed to have connected with it twenty-two graphophone instruments, the motors c of which are supplied with current from the high voltage circuit 1, 2. Inasmuch as the circuits for the motors c are the same, I will specifically describe the one shown in Fig. 1.

The motor c shown in Fig. 1, has one of its brushes 30 connected by wire 31 to the shunt circuit between the first two resistances 21, and its other brush 32 is connected by wire 33 with a terminal 34 of a circuit controller. The circuit terminal 34 has coöperating with it a circuit terminal 35 (see Figs. 2 and 6), which is connected by the wire 36 with the wire 29 of the shunt circuit. The circuit terminal 35 constitutes the movable member of the circuit controller for the motor, and makes contact with the terminal 34 when the motor c is included in circuit with the shunt circuit containing the resistances 21.

The circuit for the motor may be traced in Figs. 1 and 2 as follows:—from the main line 1 through the shunt circuit as above described to the wire 31, thence by said wire to brush 30 of motor, through the armature of the motor to brush 32, thence by wire 33 to terminal 34, thence by terminal 35 (assuming the latter to be in contact with the terminal 34), thence by wires 36, 29 to the line wire 2. It will thus be observed, that the motor c is in a shunt circuit from the shunt circuit for the magnet 5, and that the current flowing through the shunt for the magnet 5, divides at the point where the wire 31 joins the shunt for said magnet, a part flowing through the resistance 21 to the wire 29, and a part flowing through the motor to the wire 29. By thus dividing the high voltage current, a current of relatively low voltage is obtained with which the motor c may be operated with safety.

The circuit controller for the motor circuit may be operated as will be hereinafter described.

The motor c is not designed to be operated continuously, although it may be, but is designed to be operated each time a penny or other piece of money is deposited in a chute 40 in the cabinet a, and when the motor c is not in use, it is designed to be electrically cut out of circuit, which may be effected by removal of the terminal 35 from contact with the terminal 34 as will be described.

In order to avoid injurious effects upon the other motors which may be in circuit at the time the motor herein shown, is cut out, provision is made for including in circuit with the other motors, a resistance equal to that of the motor c, whereby the voltage of the relatively low voltage current is maintained the same or substantially the same, irrespective of the condition of the motors; that is, if all the motors c are at rest and out of circuit an amount of resistance equal to that of the motors is connected with the shunt circuit for the magnet 5, and if some of the motors are at rest and others are working, a resistance equal to that of the motors at rest is connected in circuit. For this purpose, each motor c has coöperating with it a resistance 42 equal to that of the motor, and said resistance is adapted to be connected in shunt relation to the shunt circuit for the magnet 5.

As represented in Fig. 1, the resistance 42 is connected at one end with the wire 31 and at its other end is connected to a wire 43 which leads to a terminal 44, with which the terminal 35 coöperates to normally close the circuit containing the resistance 42 when the motor c is out of circuit and at rest.

The circuit containing the resistance 42 may be traced as follows:—by the wire 1, automatic switch and shunt circuit for the magnet 5 to the wire 31, thence by the resistance 42, wire 43, terminals 44, 35 and wires 36, 29 to the line wire 2. It will be observed that, the circuit terminal 35 forms the movable member of two circuit controllers, and coöperates with the stationary member or terminal 34 to close the circuit of the motor, and with the stationary terminal or member 44 to close the circuit of the resistance 42 and open the circuit of the motor.

From the above description, it will be seen that each instrument or apparatus is provided with three circuit controllers, one of which governs the operation of the electromagnet 5, a second, the circuit containing the motor, and the third, the circuit containing the resistance 42. A fourth circuit controller 24 governs the shunt circuit to which all the motor circuits are connected and this circuit controller may be designated the automatic circuit controller. The circuit controller governing the magnet 5 and comprising the rod 9 and terminals 7, 8, may be designated the starting switch or circuit controller. The terminals 35, 34 may be designated the motor circuit controller, and the terminals 35, 44 the resistance circuit controller.

Each cabinet or apparatus is designed to contain a starting circuit controller, a motor circuit controller, and a resistance circuit controller, and provision is made for effecting the operation of these circuit controllers by mechanism which is located within the cabinet and is rendered effective by depositing a penny or other coin in the chute 40.

The mechanism herein shown for actuating the circuit controllers comprises a lever 50 pivoted at 51 and provided at one end with a cup or device 52 located below the chute 40 and onto which the penny drops and turns the lever 50 against the action of a spring 53. The lever 50 has attached to it an arm 54, which normally supports an arm 55 extended from a block 56 of insulating material, which block is pivoted at 57 and is provided with three arms or rods 58, 59, 9, the arm 58 coöperating with the terminal 35 to cause the latter to engage the terminal 44, and thereby close the circuit for the resistance 42 when the apparatus is not in use. The arm or rod 9 coöperates with the terminals 7, 8, as above described, and the arm 59 coöperating with a pin 60 on a vertically arranged rock-shaft 61, which is extended up into the upper case 62 of the cabinet and is provided with an arm 63, which is adapted to be engaged by a moving part of the apparatus when the latter has completed its operation. The block 56 is also provided with a hook 65 to which a spring 66 is attached.

When the apparatus is at rest, the parts are in the position represented in Figs. 1 and 2, and the motor c is at rest. When it is desired to start the apparatus in operation, a penny is deposited in the chute which is the only accessible part of the apparatus. The penny descends into the cup 52 and turns the lever 50 so as to withdraw the arm 54 from engagement with the arm 55, thereby permitting the spring 66 to turn the block 56 on its pivot and thereby bring the rod 9 into engagement with the terminals 7, 8, and remove the arm 58 from the terminal 35, which permits said terminal to spring back into engagement with the terminal 34 and close the circuit of the motor, while at the same time the circuit containing the resistance 42 is opened between the terminals 35, 44. The closing of the starting circuit controller engerizes the magnet 5, which attracts its armature and closes the shunt circuit containing the resistances 21 and thereby completes the circuit of the motor, which latter operates the graphophone apparatus in the usual way and remains in operation until the rock-shaft 61 is rocked to cause the pin 60 acting on the arm 59, to turn the block 56 and disengage the rod 9 from the terminals 7, 8, and also to engage the arm 58 with the terminal 35 and carry the latter away from the terminal 34 and into engagement with the terminal 44, thereby opening the circuit of the motor and closing the circuit of the resistance 42. The apparatus is thus stopped until it is again set in motion by the deposit of another penny in the chute 40.

All of the apparatus may be in operation at the same time, or one or more may be at rest while others are in operation, and the opening of the circuit at the starting switch of an apparatus which is at rest does not interfere with the operation of the motors whose starting switches are closed, for the reason that when the starting switch of any one apparatus is closed, the circuit of the magnet 5 is closed, and the latter is energized and the circuit of the motor or motors in operation is closed, which circuit includes the resistances 42 of those motors not in use, thereby maintaining the voltage of the current which operates the motors substantially constant.

The system is herein described as employed for operating the motors of graphophone instruments or apparatus, but it is evident that it may be employed for operating the motors of other instruments, and also other translating devices, and further it is evident any desired number of instruments within limits may be employed.

Claims.

1. In a system of the class described, in combination, a circuit of relatively high voltage, a second circuit provided with a plurality of resistances, a circuit controller governing said second circuit, an electromagnet included in the high voltage circuit to operate said circuit controller when said magnet is energized and connect said second circuit in shunt with said high voltage circuit, a plurality of branch circuits leading from said shunt circuit, electric motors in said branch circuits, resistances, one for each motor coöperating with the latter and the shunt circuit to be connected with said shunt circuit when said motors are disconnected therefrom, and circuit controllers for controlling the connection of said motors and said resistance with said shunt circuit, substantially as described.

2. In a system of the class described, in combination, a circuit of relatively high voltage, a second circuit provided with a resistance, a circuit controller governing said second circuit, an electromagnet included in the high voltage circuit to operate said circuit controller when said electromagnet is energized and connect said second circuit in shunt with said high voltage circuit, a branch circuit leading from said shunt circuit, an electric motor in said branch circuit, a resistance coöperating with said motor to be connected with said shunt circuit when said motor is disconnected therefrom, a circuit controller for the circuit containing the electromagnet, and circuit controllers for governing the connection of said motor and said resistance with said shunt circuit, substantially as described.

3. In a system of the class described, in combination, a cabinet, an electric motor supported by said cabinet, a circuit controller within said cabinet governing the operation of said electric motor, an electromagnet external to said cabinet, an electric circuit external to said cabinet and controlled by said electromagnet, a resistance in said external circuit, a branch circuit connected with said external circuit and in which said motor is included, a main line circuit in which said electromagnet is located, a circuit controller within said cabinet governing said main line circuit, and means within said cabinet for operating the circuit controllers therein, said means being operated from outside of the cabinet, substantially as described.

4. In a system of the class described, in combination, a cabinet, an electric motor supported by said cabinet, a circuit controller within said cabinet governing the operation of said electric motor, an electromagnet external to said cabinet, an electric circuit external to said cabinet and controlled by said electromagnet, a resistance in said external circuit, a branch circuit connected with said external circuit and in which said motor is included, a second branch circuit connected with said external circuit, a resistance in said second branch circuit substantially equal to that of said motor, a circuit controller governing said second branch circuit, a main line circuit in which said electro-magnet is located, a circuit controller within the cabinet governing said main line circuit, and means within the cabinet for operating the circuit controllers therein to open the second branch containing the resistance when the branch containing the motor is closed, substantially as described.

5. In a system of the class described, in combination, a circuit of relatively high voltage, an electromagnet in said circuit, a circuit controller governing said circuit, a second circuit connected in shunt with said high voltage circuit, a circuit controller operated by said electromagnet and governing said shunt circuit, a plurality of branch circuits connected with said shunt circuit, translating devices in said branch circuits, circuit controllers for said branch circuits, and means to operate said branch circuit controllers, substantially as described.

6. In a system of the class described, in combination, a circuit of relatively high voltage, an electromagnet in said circuit, a circuit controller governing said circuit, a second circuit connected in shunt with said high voltage circuit, a circuit controller operated by said electromagnet and governing said shunt circuit, a plurality of branch circuits connected with said shunt circuit, translating devices in said branch circuit, a second set of branch circuits connected with said shunt circuit and each containing a resistance substantially equal to the resistance of the said translating device, circuit controllers for said branch circuits, and means for automatically closing the branch containing the resistance when the branch containing the translating device is opened and vice versa, substantially as described.

In testimony whereof, I have signed my name to this specification in the presence of two subscribing witnesses.

RODERICK M. PALMER.

Witnesses:
JAS. H. CHURCHILL,
J. MURPHY.